O. H. W. TALBOTT & W. F. PRETTYMAN.
WHEEL LOCK.
APPLICATION FILED AUG. 28, 1916.
1,219,789.
Patented Mar. 20, 1917.
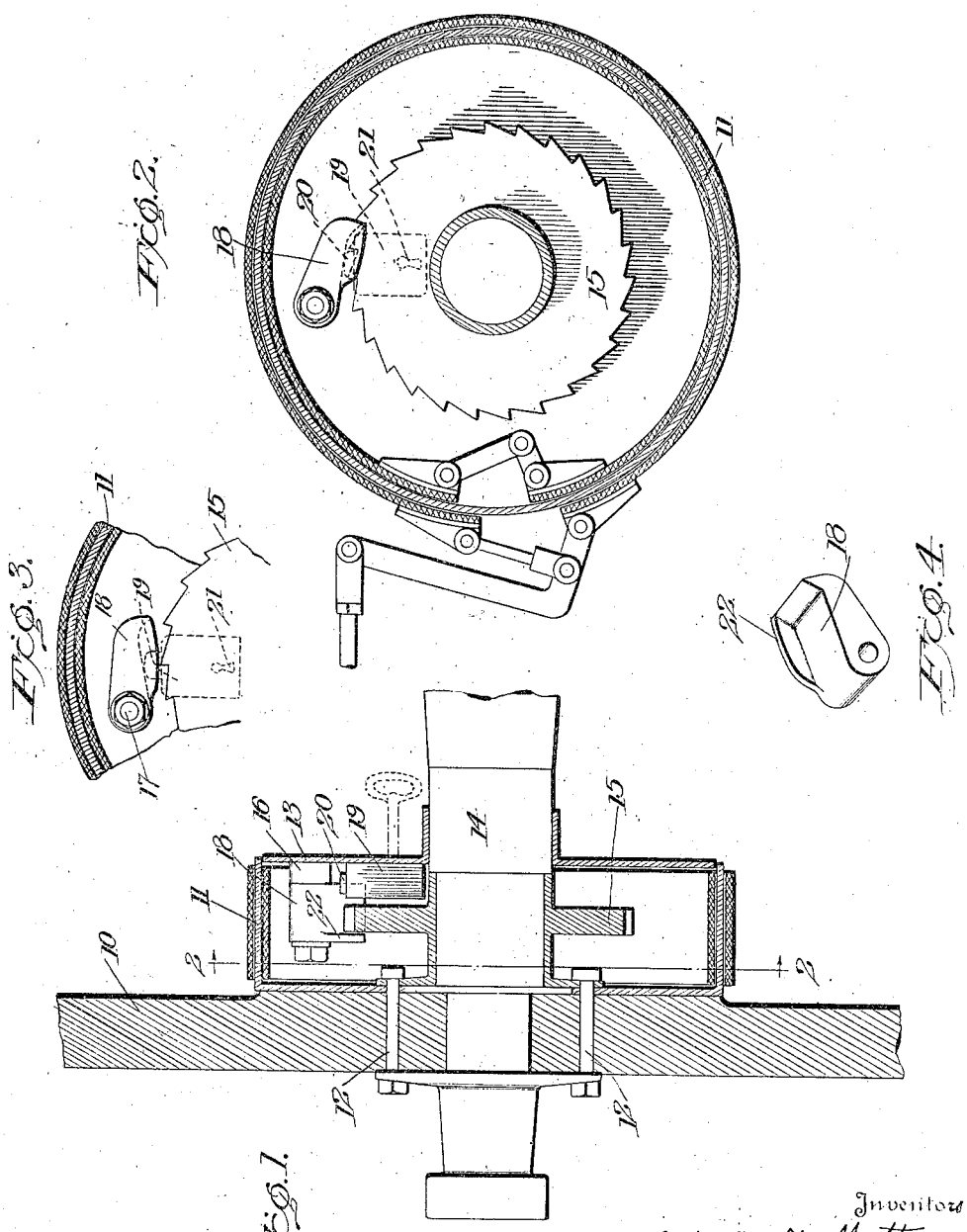

UNITED STATES PATENT OFFICE.

OTHO H. W. TALBOTT AND WILLIAM F. PRETTYMAN, OF ROCKVILLE, MARYLAND.

WHEEL-LOCK.

1,219,789.  Specification of Letters Patent.  Patented Mar. 20, 1917.

Application filed August 28, 1916. Serial No. 117,296.

*To all whom it may concern:*

Be it known that we, OTHO H. W. TALBOTT and WILLIAM F. PRETTYMAN, citizens of the United States, and residing at Rockville, Montgomery county, State of Maryland, have invented certain new and useful Improvements in Wheel-Locks, of which the following is a specification.

The invention relates to devices for preventing stealing or unauthorized movement of a vehicle. More particularly it consists of means to be attached to a vehicle wheel whereby the rotation of the same may be prevented. It also includes means for preventing the removal of the wheel so that the locking means cannot be disengaged after the removal of the wheel.

In the drawings, in which like reference characters indicate the same part in the different views, Figure 1 is a longitudinal section through a wheel with the attached brake drum and showing the locking device, the axle and housing therefor being shown in elevation.

Fig. 2 is a cross sectional elevation taken on the line 2—2 of Fig. 1 and looking in the direction indicated by the arrows, the axle and housing not being shown.

Fig. 3 is a detail similar to Fig. 2 but showing the locking pawl thrown out of engagement with the ratchet wheel.

Fig. 4 is a perspective view of the locking pawl showing the flange for preventing the removal of the vehicle wheel.

In the embodiment shown the locking device is illustrated as applied to the rear wheel of a vehicle. The rear wheel 10 carries the usual brake drum 11 which may be fastened to the wheel in any suitable manner and is illustrated as attached thereto by means of the bolts 12, extending through the wheel. A plate 13 is rigidly connected with the axle housing 14 in any desired manner and together with the brake drum 11 forms a casing. Mounted within the casing and connected to the wheel for rotation therewith in any suitable manner is a ratchet wheel 15. In the embodiment illustrated the ratchet wheel is shown as mounted on the axle housing and connected to the vehicle wheel by the bolts 12 which also hold the brake drum. The non-rotative element 13 of the casing is formed with a boss 16 which carries a stud 17 on which is pivotally mounted the pawl 18 in position to coöperate with the ratchet wheel 15. The non-rotative element 13 also carries a lock 19, the bolt 20 of which is adapted to coöperate with the pawl 18 and when projected from the lock to throw the pawl out of engagement with the ratchet wheel. The plate 13 is formed with a key opening 21 through which a key may be inserted to operate the lock. The pawl is provided at the side adjacent the vehicle wheel with a downwardly extending flange 22 which, when the pawl is in engagement with the ratchet wheel, is adapted to lie beside the ratchet wheel and prevent outward movement of the same. Thus if the hub cap and means for retaining the vehicle wheel on the axle are removed, the wheel itself cannot be taken off as the flange 22 will prevent outward movement of the ratchet wheel which in turn is rigidly connected with the vehicle wheel.

It will be noted that the pawl 18 normally is in engagement with the ratchet wheel, thus locking the wheel against forward rotation. Consequently with the pawl in its normal position the vehicle cannot be moved forward. The pawl is thrown out of engagement with the ratchet wheel by operating the lock to project the bolt 20 and move the pawl outward from the periphery of the ratchet wheel, also carrying the flange 22 outside of the periphery of the ratchet wheel. With the pawl in this disengaged position the ratchet and vehicle wheel may be rotated either forward or backward and if necessary the vehicle wheel may be removed from the axle, as the flange 22 is not in the path of outward movement of the ratchet wheel.

It will thus be seen that a very simple mechanism is provided for preventing the forward rotation of a wheel, and one which is readily attached to a vehicle without any substantial modification of the structure of the same. While the device is shown in connection with a rear wheel and brake drum it is obvious that it may be attached or arranged in connection with other wheels not having brake drums. In this latter case it is obvious that the casing would be modified to meet the conditions of the vehicle wheel structure, the only requirement being that the pawl and lock be fastened to a non-rotative part of the vehicle.

It is obvious that this locking device may be used with any type of vehicle such as automobiles, bicycles and motorcycles.

Having thus described the invention what is claimed is:

1. The combination with the rear driving wheel of a motor vehicle having a brake drum thereon, of key actuated means within said drum for locking the said wheel against forward rotation, and means for disengaging said locking means on rearward rotation of the said wheel.

2. In combination with the non-rotative rear axle housing of a motor vehicle and the rear wheel having a brake drum thereon, means for locking the wheel against forward rotation comprising a member within the drum connected to the axle housing, and a second member within the drum connected to rotate with the wheel, one of said members being mounted for movement transverse to the axis of the axle into or out of engagement with the other member.

3. In combination with the non-rotative rear axle housing of a motor vehicle and the rear wheel having a brake drum thereon, means for locking the wheel against forward rotation comprising a member within the drum connected to the axle housing, a second member within the drum connected to rotate with the wheel, one of said members being mounted for movement transverse to the axis of the axle into or out of engagement with the other member, and key actuated means for controlling the engagement of said members.

4. In combination with the non-rotative rear axle housing of a motor vehicle and the rear wheel having a brake drum thereon, means for locking the wheel against forward rotation comprising a ratchet wheel member within the drum and a pawl member, one of said members connected to the axle housing and the other to the wheel, and means for moving the pawl into or out of engagement with the ratchet wheel.

5. In combination with the non-rotative rear axle housing of a motor vehicle and the rear wheel having a brake drum thereon, means for locking the wheel against forward rotation comprising a member within the drum connected to the axle housing, a second member within the drum and adapted to coact with the first member, and means for locking the wheel against removal when the members are in engagement.

6. In combination with the non-rotative rear axle housing of a motor vehicle and the rear wheel having a brake drum thereon, means for locking the wheel against forward rotation comprising a member within the drum connected to the axle housing, a second member within the drum and adapted to coact with the first member, and means on one member coöperating with the other member to lock the wheel against removal when the members are in engagement.

7. A vehicle having a wheel, a casing, a ratchet wheel member and coöperating pawl member within the casing, one of said members connected to the wheel and the other to a non-rotative part of the vehicle, said pawl having a side flange coöperating with the ratchet wheel adapted to prevent removal of the vehicle wheel when the pawl is in engagement with the ratchet wheel, and key actuated means for raising the pawl and its flange out of engagement with the ratchet wheel.

8. A vehicle having a wheel, a casing, a ratchet wheel member and coöperating pawl member within the casing, one of said members connected to the wheel and the other to a non-rotative part of the vehicle, and means for locking the vehicle wheel against removal and comprising a flange on one member coöperating with the other member when they are in engagement.

9. A vehicle having a wheel, a casing, a wheel within the casing and connected to rotate with the vehicle wheel, and key actuated means within the casing and coöperating with the wheel therein for locking the vehicle wheel against forward movement and also against removal from the vehicle.

10. A vehicle having a wheel, a casing including a part adapted to be attached to a non-rotative member of the vehicle, a ratchet wheel inclosed in said casing and connected to rotate with the vehicle wheel, and key actuated means carried by the non-rotative part of the casing and coöperating with the ratchet wheel to prevent forward movement and removal of the vehicle wheel.

11. A vehicle having a wheel, a casing including a part adapted to be attached to a non-rotative member of the vehicle, a ratchet wheel inclosed in said casing and connected to rotate with the vehicle wheel, a pawl normally engaging said ratchet wheel and having a side flange coöperating therewith adapted to prevent removal of the vehicle wheel when the pawl is in engagement with the ratchet wheel and key operated means for raising the pawl and its flange out of engagement with the ratchet wheel.

In testimony whereof we affix our signatures.

OTHO H. W. TALBOTT.
WILLIAM F. PRETTYMAN.